Sept. 30, 1969      F. L. ZELLNER      3,469,919

ELECTRONIC SURVEYING INSTRUMENT

Filed July 14, 1965      2 Sheets-Sheet 1

INVENTOR.
FLOYD L. ZELLNER

BY *Kimmel, Crowell & Weaver*
ATTORNEYS.

INVENTOR.
FLOYD L. ZELLNER
BY Kimmel, Crowell & Weaver
ATTORNEYS.

United States Patent Office 3,469,919
Patented Sept. 30, 1969

3,469,919
ELECTRONIC SURVEYING INSTRUMENT
Floyd L. Zellner, Seattle, Wash., assignor of fifty percent to Glenn Reynolds, Tulsa, Okla.
Filed July 14, 1965, Ser. No. 471,826
Int. Cl. G01c 3/08
U.S. Cl. 356—4                                   5 Claims

ABSTRACT OF THE DISCLOSURE

An electronic surveying system including a laser beam projector coupled with a power rotated 45° angled mirror to produce a horizontal datum. A receiver having adjustable paired antenna arranged to signal when intersected by the horizontal datum beam, and an indicator panel is associated with the receiving station to convey information concerning the relationship between the paired antennas and the beam.

---

This invention relates to an electronic surveying instrument, and more particularly to a surveying device including a rotating beam of high frequency energy forming a datum plane and a pair of antennae spaced from the sending unit to detect the height of the datum plane.

It is an object of this invention to provide a surveying system which is particularly adapted for surveying low relief terrain which is substantially free from human error.

Another object of this invention is to provide a surveying device utilizing a datum plane created by a rotating band of high frequency energy.

Another object of this invention is to provide a surveying system which is simple in operation and results in the rapid surveying of a given area.

It is another object of this invention to provide a receiver station for a surveying instrument utilizing a rotating band of high frequency energy with the receiver station providing indicia for accurately and rapidly determining the elevation thereof.

Other objects and advantages of this invention reside in the combinations of elements, arrangements of parts, and features of construction and utilization, all as will be more fully pointed out hereinafter and disclosed in the accompanying drawings wherein there are shown preferred embodiments of this inventive concept.

Figure 2:
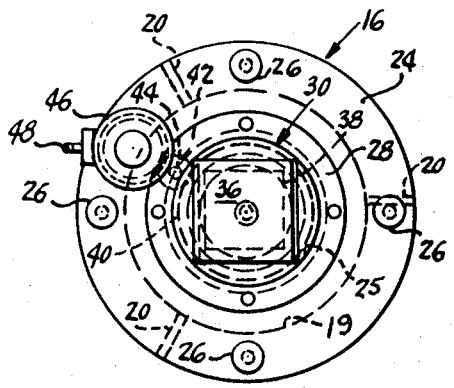
FIGURE 2 is a top plan view of the upper surface of the tripod of FIGURE 1 as seen from line 2—2 and viewing in the direction of the arrows.
Figure 1:
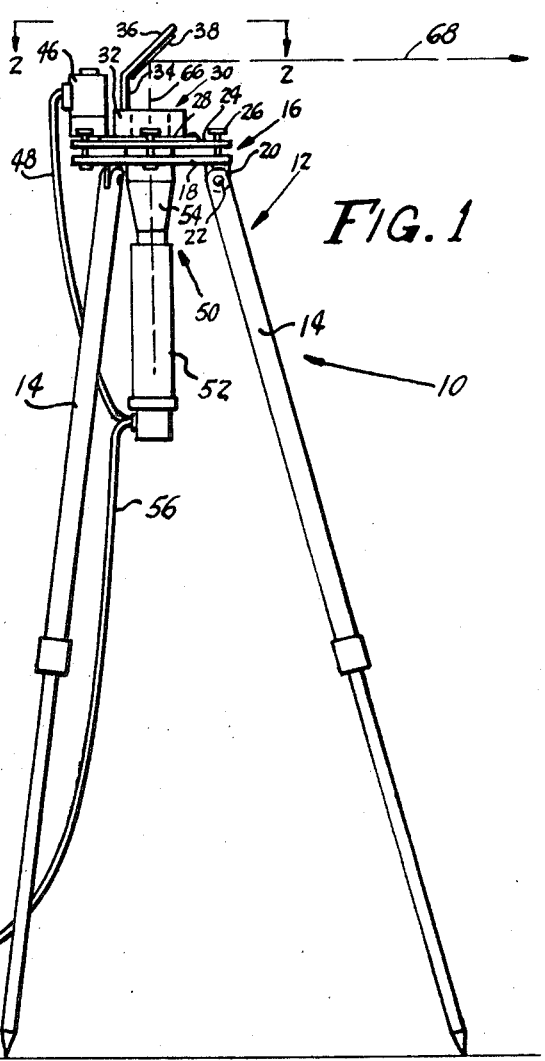
FIGURE 1 is a side elevational view of a sending station utilizing a rotating band of high frequency energy to establish a datum plane.

Referring now to the drawings in detail, wherein like reference characters designate like elements throughout the several views thereof, there is indicated generally at 10 a sending station including a tripod shown generally at 12 having the customary telescoping and pivotable legs 14 and an upper planar working area shown generally at 16.

Working area 16 includes a first circular plate 18 having a central aperture 19. The plate 18 is secured to legs 14 by a series of brackets 20 and pins 22. Working area 16 also includes an upper circular plate 24 having a central opening 25 coaxial with and of lesser diameter than aperture 19. Plate 24 is secured to first plate 18 by a plurality of screws 26 threadably received in plate 18. A conventional leveling device (not shown), such as a bubble level, may be provided on plate 24 to assure its being level in order to create a horizontal datum as more fully explained hereinafter.

A collar 28 is secured to the upper plate 24 and has rotatably mounted therein a mirror assembly shown generally at 30. Mirror assembly 30 includes a sleeve 32 mounted in collar 28 to which is fixedly secured an upstanding bracket 34 carrying a mirror backing 36 at a 45° angle with respect to bracket 34. A highly polished mirror 38 is secured to mirror backing 36 overlying apertures 19, 25 as more fully explained hereinafter. Sleeve 32 carries an outer peripheral ring gear 40 in driving engagement with a circular gear 42 rotatably mounted on a pin 44 mounted on collar 28. In driving engagement with gear 42 is an electric motor 46 mounted by any convenient means on plate 24 and having an electrical power inlet 48. It is seen that the input of energy into electric motor 46 will drive gear ring 42 about pin 44 and consequently rotate mirror assembly 30 in collar 28.

Secured to working area 16, coaxial with openings 19, 25 is an energy source shown generally at 50 including a laser 52 or other source of electromagnetic energy which produces a uniform non-defusing beam of energy at any distance. A collimator 54 may, if necessary, be provided between laser 52 and mirror 38 to enhance and perfect the parallel nature of the rays produced by laser 52. An electrical conduit 56 leads from laser 52 and from inlet wire 48 of electric motor 46 to a power source 58 and amplifier 60 of any conventional type which are preferably portably mounted as by platform 62 and wheels 64.

In the operation of sending device 10, tripod 12 will be positioned over a bench mark or other location of known elevation with upper plate 24 being leveled by the adjustment of screws 26. Suitable control devices on power source 58 and amplifier 60 will be operated to deliver energy to laser 52 and electric motor 46. The creation of a beam of energy 66 from laser 52 will result in a horizontal beam of energy 68 after beam 66 has been reflected from mirror 38. The rotation of mirror housing 30 by electric motor 46 will result in a rotating beam of energy thus creating a horizontal datum from which measurements may be taken as explained hereinafter. It should be apparent that motor 46 may rotate mirror housing 30 at any desired rate of speed including a very rapid rate, such as on the order of 60 to 300 revolutions per minute.

Figure 5:
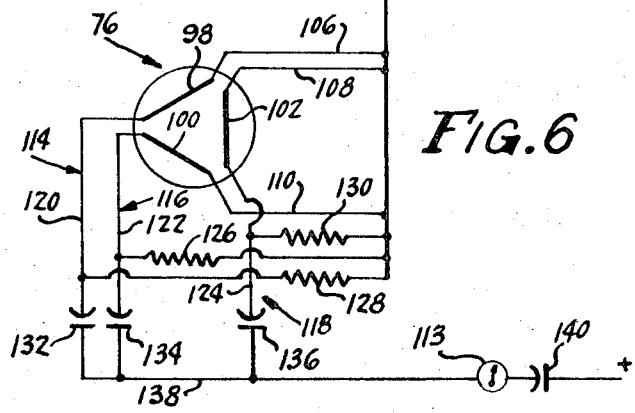
FIGURE 5 is a cross-sectional view of one form of antenna of the instant invention taken along line 5—5 of FIGURE 4 and viewing in the direction of the arrows.
Figure 4:
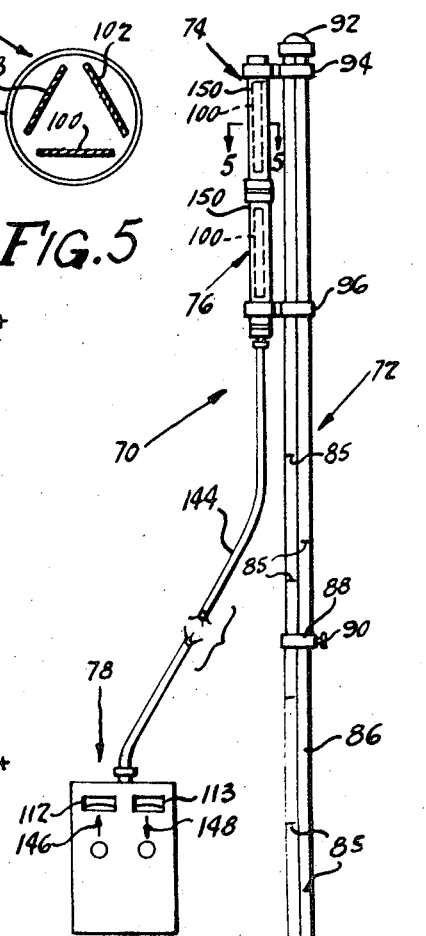
FIGURE 4 is a side elevational view of the receiving station of the instant invention.

Referring now to FIGURES 4 and 5, a receiver station is shown generally at 70, the major components of which are a stand indicated generally at 72, a pair of substantially identical antennae shown generally at 74, 76 and an indicator panel shown generally at 78.

Stand 72 is preferably provided with a conventional ground engaging base such as a tripod (not shown), but is shown in FIGURE 4 as resting on a surveyor's stake or other permanent body 80 on surface 82 at a location where it is desired to measure elevation. Stand 72 is an adjustable surveyor's rod and includes a stationary member 84 slidingly connected to a reciprocable member 86 by an adjustable bracket 88 having adjusting means 90 thereon. A cap 92 is conveniently provided on the upper end of members 84, 86 and reciprocates with member 86.

Releasably coupled to slidable member 86 by a pair of clamps 94, 96 are antennae 74, 76. Clamps 94, 96 are of any conventional type that allow the movement of antennae 74, 76 with slidable member 86. By providing a series of suitable indicia 85 on members 84, 86 it will be seen that the height of the juxtaposition of antennae 74, 76 may readily be determined by an individual at the receiver station.

In the operation of receiving station 70, sending station 10 will be actuated to provide a horizontal datum 68 at a predetermined elevation. Stand 72 will be positioned at the location of which it is desired to determine the elevation with adjusting means 90 of clamp 88 being loosened so that slidable member 86 may be moved upwardly. Member 86 will be reciprocated until rotating energy beam 68 activates one of antennae 74, 76 as more fully explained hereinafter. Slidable member 86 will then be moved a slight distance until the other of antenna 74, 76 is activated by beam 68.

The sliding movement of member 86 will be continued until beam 68 is located at the juxtaposition of antennae 74, 76 so that both antennae are activated. Since beam 68 is of a given diameter because of the characteristics of laser 52, it will be apparent that a very thin datum plane has been established. At the time when both antennae 74, 76 are activated, adjusting means 90 of bracket 88 will be tightened to secure slidable member 86 to stationary member 84. At such time indicia 85 of members 84, 86 will be read to determine the height of datum plane 68 from surface 82 to calculate the elevation thereof.

It should be apparent that antennae 74, 76 may be moved apart by moving brackets 94, 96 away from each other to create a band or gap between antennae 74, 76 of a width substantially identical to the width of beam 68. When antennae 74, 76 are so positioned, it will be apparent that the positioning of beam 68 between antennae 74, 76 will result in a very accurate surveying reading. In such a condition, the slight upward movement of member 86 will result in the activation of antenna 76 and the slight downward movement of member 86 will result in the activation of antenna 74.

Antennae 74, 76 include a plurality of elongated photocells 98, 100, 102 arranged to form a substantially closed polyhedron with one electrical connection of cells 98, 100, 102 being connected to a common ground wire 104 by a series of electrical conduits 106, 108, 110. The other electrical connection of cells 98, 100, 102 is connected to a conventional electric signal indicator 112, 113 by a circuit shown generally at 114, 116, 118.

Figure 6:
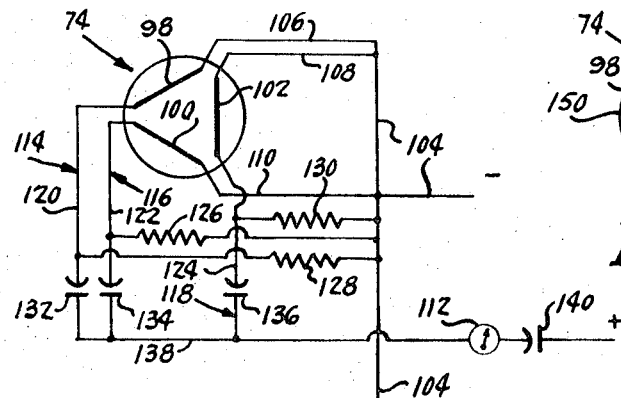
FIGURE 6 is a schematic circuit utilizable with the omnidirectional antenna as shown in FIGURE 5.

Each of circuits 114, 116, 118 includes an electrical connection 120, 122, 124 leading from the other electrical connection of cells 98, 100, 102 and a resistor 126, 128, 130 leading from wires 120, 122, 124 to common ground 104. Each circuit 114, 116, 118 also includes a capacitor 132, 134, 136 connecting wires 120, 122, 124 to a common lead-in wire 138 leading to an electrical indicator 112, 113. An isolation capacitor 140 is provided in common outlet wire 138 as shown in FIGURE 6.

The circuitry of antennae 74, 76 may be contained interiorly of photocells 98, 100, 102, or may be enclosed in indicator panel 78 which is connected to antennae 74, 76 by a conventional electrical cable 144.

When receiving station 70 is positioned to measure the elevation of a given point, beam 68 will energize one of photocells 98, 100, 102. For purposes of illustration it is assumed that photocell 98 of upper antennae 74 is activated. A pulsating flow of current will be induced in wire 120 which, because of its pulsating nature, will bridge capacitor 132 to activate electrical signal device 112. Between pulses, any charge built up in capacitor 132 will be bled off to ground 104 by way of resistor 128. Since electrical signal indicator 112 has been activated, an operator will realize that energy datum 68 is positioned above the juxtaposition of antennae 74, 76 because of the indicia 146 on indicator panel 78.

Slidable member 86 will then be raised until, for purposes of illustration, photocell 98 of lower antennae 78 is activated. At this time electrical signalling device 113 is actuated, and because of indicia 148, informs the operator that slidable member 86 must be moved downwardly to approach the correct position. When photocells 98 of both antennae 74, 76 are activated both dials 112 and 113 will be actuated thereby indicating that the datum of sending unit 10 has been accurately found. At this time the reading of indicia may be made from poles 84, 86 and thereby determine the height of surface 82.

When antennae 74, 76 are spaced apart at a distance slightly greater than the diameter of beam 68, member 86 will be reciprocated until neither of antennae 74, 76 are activated with a small movement of member 86 resulting in the actuation of one of them as previously discussed.

It has been found that the use of a filter 150 surrounding photocells 98, 100, 102 will render receiving station 70 more accurate since the saturation of photocells 98, 100, 102 by sunlight will be avoided thereby. Accordingly, filter 150 is such that much of the light energy, excluding the frequency of energy beam 68, will be absorbed by filter 150 rather than by photocells 98, 100, 102.

Figure 3:
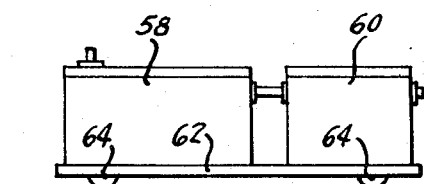
FIGURE 3 is a schematic circuit of one form of receiving station utilizable with the sending station of FIGURE 1.
Figure 3:
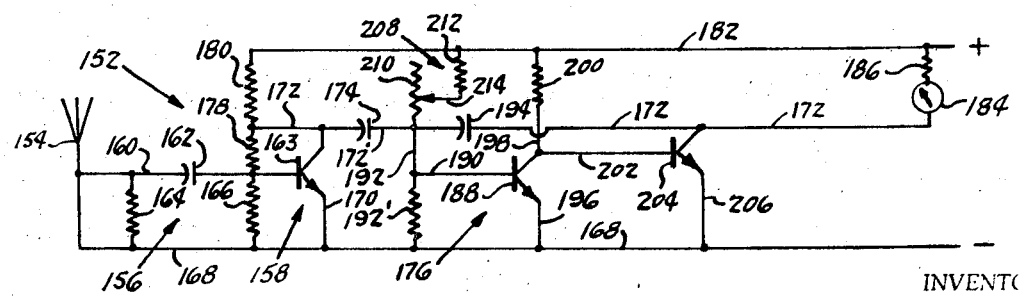

Referring now to FIGURE 3, there is shown generally at 152 an alternative form of antennae circuit which is unidirectional rather than the omni-directional arrangement of antennae 74, 76. Circuit 152 includes an antennae 154 connected by a tuned circuit shown generally at 156 connected to the input of an amplifier circuit shown generally at 158. Tuned circuit 156 includes a connection 160 capacitatively coupled by a capacitor 162 to the base of a transistor 163 of amplifier circuit 158 and a pair of resistors 164, 166 connected on each side of capacitor 162 to a common ground wire 168. The emitter connection of transistor 163 is connected by a wire 170 to common ground 168 with the collector end of transistor 163 being connected by a wire 172 and a capacitor 174 to an oscillator circuit shown generally at 176.

The base of transistor 163 is connected to a resistor 178 which is connected by a resistor 180 to a wire 182 leading to a nelectrical signalling device 184 having a resistance 186.

Oscillator circuit 176 includes a first transistor 188 the base of which is connected by wire 190 and resistor 192' to common ground 168 and by wires 190, 192 to wire 172 leading to electrical signalling device 184 through capacitor 194. The emitter connection of first transistor 188 is connected by a wire 196 to common ground 168 and by a wire 198 and a resistor 200 to electrical connection 182 leading to electrical signal indicator 184. The collector connection of first transistor 188 is connected by a wire 202 to the base of a second transistor 204 the emitter connection of which is connected by wire 206 to common ground 168. The collector connection of second transistor 204 is connected to wire 172 leading to electrical signal indicator 184.

A sensitivity control shown generally at 208 includes a first resistor 210 connected to outlet wire 172 and a second resistor 212 connected to second outlet wire 182 with resistor 212 having a movable electrical connection 214 in contact with resistor 210.

Figure 7:
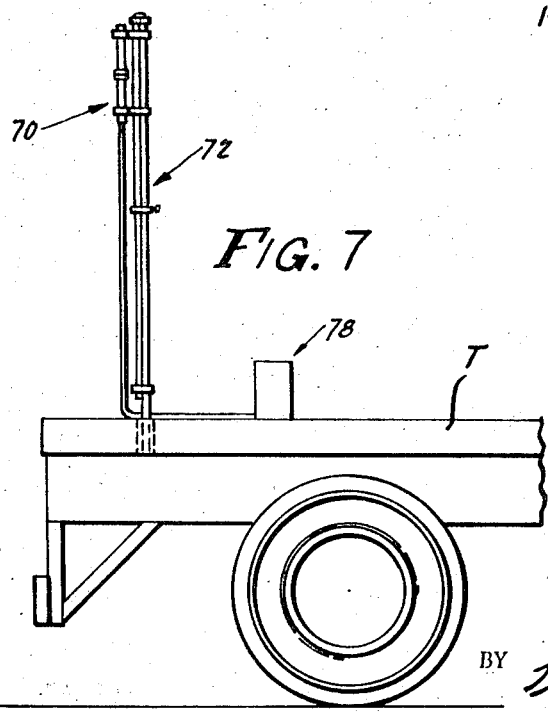
FIGURE 7 is a view showing the receiving station mounted on the rear of a vehicle.

Referring now to FIGURE 7, receiving station 70 is mounted on a truck or other vehicle T by the securement of stand 72 in the bed thereof. The positioning of indicator panel 78 closely adjacent thereto allows an operator to drive truck T to a known point, stop the vehicle, and quickly determine the elevation thereof. Alternatively, truck T may be slowly moved along a level path for determining approximate elevational readings.

From the foregoing it is now seen that there is herein provided an electronic surveying instrument having all of the objects and advantages of this invention and others, including many advantages of great practical utility and commercial importance.

Since many embodiments may be made of the instant inventive concept and since many modifications may be made in the embodiments hereinbefore shown and described, it is to be understood that the foregoing is to be interpreted merely as illustrative and not in a limiting sense.

I claim:
1. An electronic surveying system comprising
    a sending station including ground support means for creating a vertical energy beam of small uniform unchanging diameter,
    a mirror arranged at an angle of 45° to the vertical, overlying, intercepting, and reflecting said beam,
    means on said ground support means supporting said mirror for rotation about a vertical axis,
    an electric motor drive on said ground support means for rotating said mirror continuously while said vertical energy beam is energized to establish a horizontal datum plane,
    a receiving station including ground support means having thereon at least two vertically spaced antenna means for sensing said energy beam with said beam normally falling between said antenna at the intersection of said beam and said receiving station, and
    means mounting said antenna means on said last named ground support means for vertical adjustment thereon and for vertical adjustment of the spacing between said antenna means.
2. The structure of claim 1 wherein said ground support means of said receiver station includes indicia for determining the distance between said energy beam and a surface underlying said ground support means of said receiver means.
3. The structure of claim 2 wherein said antennae means of said receiver circuit includes an indicator panel for informing an operator of the energization of said antennae.
4. The structure of claim 1 wherein said antenna include a plurality of photocells arranged to form a substantially closed polyhedron to provide an omni-directional antenna.
5. The structure of claim 4 wherein said receiving station is mounted on a vehicle having ground engaging means providing mobility.

References Cited

UNITED STATES PATENTS

| | | |
|---|---|---|
| 1,922,791 | 8/1933 | Bumpus. |
| 2,661,653 | 12/1953 | Castiglia _____ 88—2.2 X |
| 2,776,357 | 1/1957 | Porath. |
| 2,796,685 | 6/1957 | Bensinger. |
| 2,916,836 | 12/1959 | Stewart et al. |
| 3,004,162 | 10/1961 | Menke _____ 250—236 |
| 3,168,023 | 2/1965 | Harmon. |
| 3,242,340 | 3/1966 | Layne _____ 250—208 |
| 3,266,014 | 8/1966 | Loetta _____ 240—49 X |
| 3,279,070 | 10/1966 | Blount et al. _____ 33—46.2 |
| 3,364,356 | 1/1968 | Jones. |

FOREIGN PATENTS 512,386 7/1962 Belgium.

RONALD L. WIBERT, Primary Examiner

J. ROTHENBURG, Assistant Examiner

U.S. Cl. X.R.

33—46.2; 250—236; 331—94.5; 356—172